UNITED STATES PATENT OFFICE.

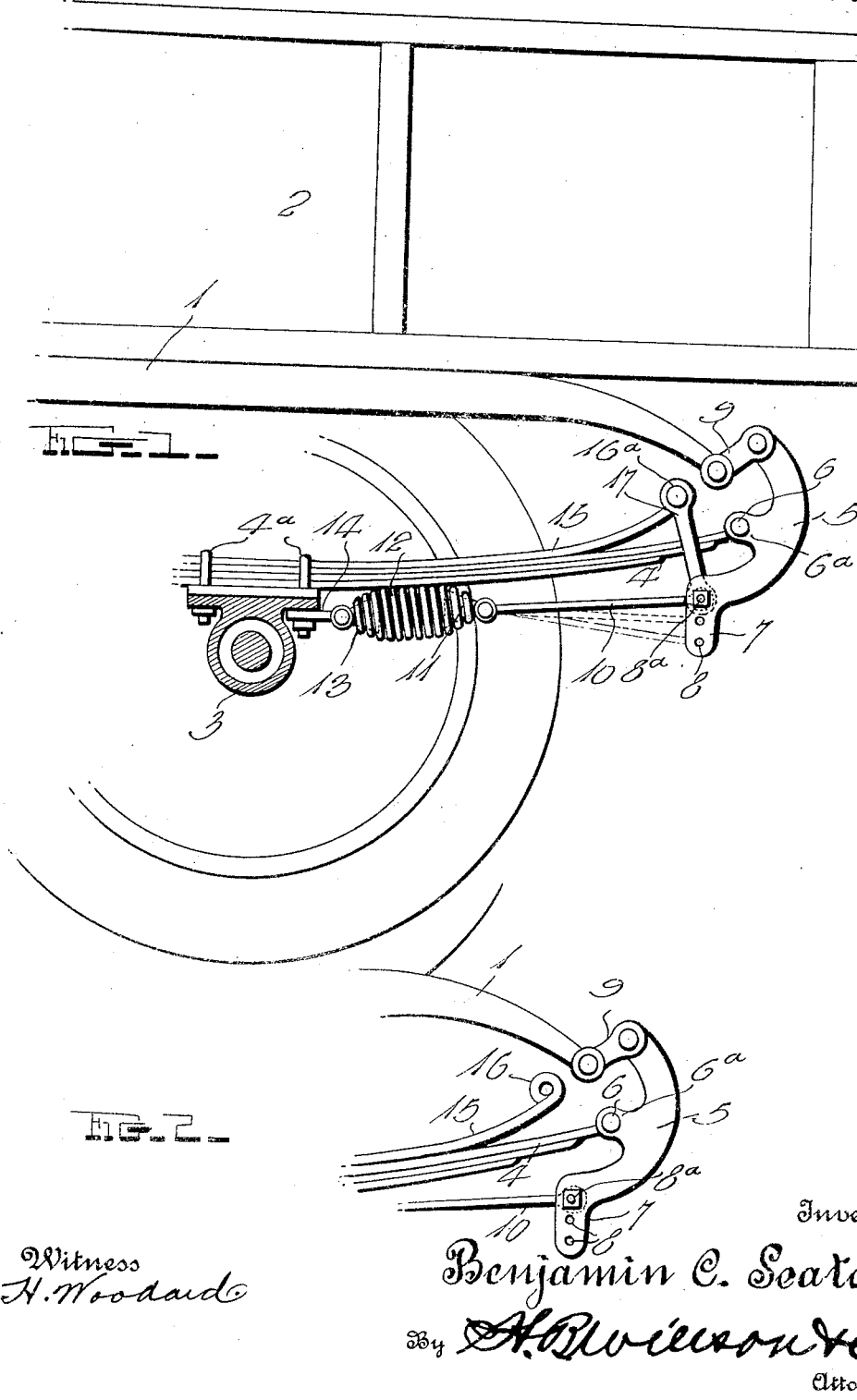

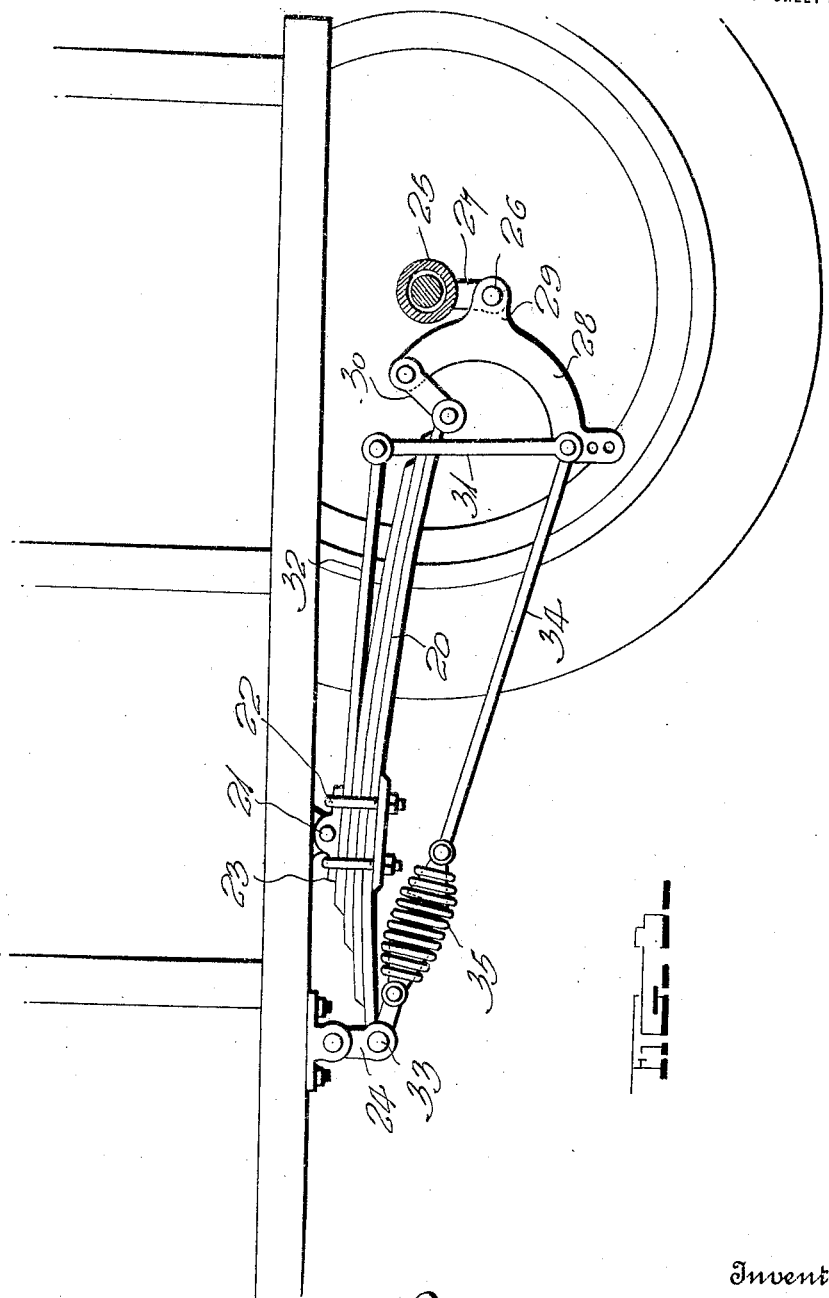

BENJAMIN C. SEATON, OF NASHVILLE, TENNESSEE.

THREE-WAY-FULCRUM SHACKLE FOR VEHICLE SPRINGS.

1,412,493.  Specification of Letters Patent.  Patented Apr. 11, 1922.

Application filed November 11, 1920. Serial No. 423,374.

*To all whom it may concern:*

Be it known that I, BENJAMIN C. SEATON, a citizen of the United States, residing at Nashville, in the county of Davidson and State of Tennessee, have invented certain new and useful Improvements in Three-Way-Fulcrum Shackles for Vehicle Springs; and I do declare the following to be a full, clear, and exact description of the invention, such as will enable others skilled in the art to which it appertains to make and use the same.

This invention relates generally to vehicle springs and more particularly to what I prefer to term a three-way fulcrum shackle, such shackle being especially designed for use in connection with the usual leaf springs of trucks and other motor vehicles. It is well known that more damage is done to trucks and other motor driven machines when running empty or with a light load than when they are loaded approximately to full capacity, this being due to the fact that the usual springs do not effectively act to absorb road shocks until they are under approximately the full load which they are designed to carry. My invention however aims to overcome this undesirable characteristic of the present day machine, by providing an improved form of spring shackle which will support an empty body or light load as yieldably as the usual springs support maximum loads. Hence, the machine is not subjected to severe road shocks and their injurious effects, with the result that the life of the vehicle is greatly increased.

Another object of my invention is to provide a shackle of the class set forth which may be used to equal advantage on all types of springs now in use, for instance semi-elliptic, three-quarter-elliptic, full-elliptic and cantilever, the arrangement being such that no alterations in the old spring structure are necessary.

A still further object is to provide a spring shackle of the class set forth which will be comparatively simple, strong, durable and inexpensive, and one which will be effective and reliable in every way, and well adapted to numerous types of machines.

With the foregoing and minor objects in view the invention resides in the novel construction and combination of parts hereinafter described and claimed, the descriptive matter being supplemented by the accompanying drawings.

Figure 1 is a side elevation partly in section, showing the application of my invention to a semi-elliptic spring.

Figure 2 is a detail side elevation showing a slight change over the construction depicted in Fig. 1.

Figure 3 is a view similar to Fig. 1 but illustrating the application of my invention to a vehicle equipped with cantilever springs.

In all forms of my invention, I employ a lever which is pivotally connected with the master leaf of a vehicle spring and similarly connected at a spaced point to the part of the vehicle with which said master leaf is usually connected and suitable spring means are employed to yieldably resist the pivotal movement of said lever during the travel of the machine, whereby to effectively absorb road shocks which would not affect the usual vehicle springs, due to their comparative stiffness. It thus follows that with light loads or comparatively no load, the vehicle body will be yieldably supported as effectively as if the springs were under maximum load. The invention may be used in connection with numerous forms of vehicle springs and in Figs. 1 and 2, I have shown its application to a semi-elliptic spring.

In the figures just mentioned, the numeral 1 designates a side bar of the chassis frame of a motor vehicle, such as a truck, said frame supporting an appropriate body 2. The numeral 3 designates the rear axle of the machine and a semi-elliptic spring 4 is secured between its ends to the axle casing, by means of the usual spring clips $4^a$. Whereas the master leaf of the spring 4 was previously connected with the side bar 1, before installation of the present invention, said master leaf is now fulcrumed to a lever 5 which is preferably of the curved formation shown. The fulcrum pin or bolt 6 is preferably although not necessarily located approximately midway between the ends of the lever 5 and is passed through an ear $6^a$ which projects from the inner curved side of said lever. The lower end of this lever preferably turns laterally outward as shown at 7 and is provided with a plurality of spaced bolt-holes 8, while the upper end of said lever is pivotally connected by means of a link or the like 9, with the chassis bar 1.

Pivoted at one to the lever 5, by means of a bolt $8^a$ passing through any of the openings 8, is a rod 10, the other end of said rod having a suitable connection 11 with one end of a coiled spring 12, the other end of said spring being connected in any suitable way with the axle housing. I prefer however that the spring 12 shall be attached by means of a suitable connection 13 to a plate 14 which may well be anchored by one of the spring clips 4ª as shown in Fig. 1.

Secured against the upper side of the vehicle spring 4, is a supplemental spring leaf 15, said supplemental leaf being preferably secured in place by the clips 4ª as shown clearly in Fig. 1. At its rear end, the spring leaf 15 curves upwardly from and diverges rearwardly with the spring 4, said leaf 15 being provided at its free end with a knuckle 16 through which a bolt or the like 16ª extends to connect the upper end of a link 17 with the leaf 15, the lower end of said link being connected with the lever 5 by means of the bolt 8ª.

The operation of the construction so far described, is as follows: Any downward movement of the body or corresponding upward movement of the running gear, will exert a pull on the link 9 which tends to move said link to a vertical position, with the result that the upper end of the lever 5 is pulled forwardly, said lever 5 being then rocked upon the fulcrum 6 but being yieldably resisted in this movement, by means of the springs 12 and 15. By adjusting the bolt 8ª downwardly in the openings 8, not only is the spring 15 put under greater tension, but the distance between said bolt and the fulcrum 6, is increased, so that the lever 5 will have less leverage on the spring 12. It will thus be seen that the device may be adjusted according to the weight of the body so as to resiliently support the latter when it is either empty or partly loaded. Whenever an approximately maximum load is being carried, the springs 12 and 15 yield to such an extent that said spring 15 flattens out against the upper surface of the spring 4 so that the latter will carry the full load, and attention may here be directed to the fact that as the spring 15 gradually springs down against the spring 4, the point of contact between these parts gradually near the point at which the link 17 is pulling downwardly. In other words, the upwardly curved free end of the spring 15 gradually shortens as it is being pulled downwardly and it consequently becomes stiffer in proportion to the load pulling downwardly thereon.

If desired, I may use the device with the parts 10, 12 and 14 detached, then relying on the spring 15 and link 17 to control the rocking of the lever 5, or I may eliminate the link 17 as illustrated in Fig. 2 and retain the rod 10 and the spring 12. If the latter arrangement is employed, the device will still effectively absorb shocks and when substantially maximum load is being carried, the chassis bar 1 will strike the knuckle 16 thereby bringing the spring 15 into play and then acting directly on the spring 4, after said spring 15 has been depressed to the maximum.

While I have shown my invention in connection with a semi-elliptic spring, it will be obvious that it could well be employed in connection with full elliptic, three-quarter-elliptic, cantilever and numerous other forms of springs. When used with a cantilever spring, the device is constructed and installed as shown in Fig. 3. In this figure, the numeral 20 designates a cantilever spring which is fulcrumed at 21 to the chassis frame, the usual spring clips 22 being employed for securing said spring to a plate or the like 23 which is connected to the fulcrum 21. The spring 20 extends forwardly to a slight extent from the clips 22 and is connected by links or the like 24 with the chassis frame, while the rear end of said spring projects rearwardly to a much greater extent and is usually connected with the axle housing 25 by means of a bolt 26 which is here shown passing through a depending lug 27. When installing the present invention however the master leaf of the spring 20 is detached from the axle housing and the bolt 26 is utilized to form a fulcrum for an arcuate lever 28 which is of the same formation as the lever 5, with the exception that it is provided with a fulcrum lug 29 extending from its outer curved edge instead of from its inner edge. A link 30 is employed for pivotally connecting the upper end of lever 28 with the master leaf of the spring 20 while the lower end of said lever is connected by a link 31 with a supplemental leaf 32 which is clamped on top of the spring 20 by means of the spring clips 22. The lower end of lever 28 is also connected with a relatively fixed part, for instance with the bolt 33 at the front end of the spring 20, by means of a rod 34 and a coiled spring 35.

The operation of the form of construction just described is as follows: Light loads in the body of the machine or the mere weight of said body do not bring the spring 20 into play but they rock the lever 28 on its fulcrum 26, thereby pulling on the link 31 and the rod 34 and acting on the springs 32 and 35, which springs then serve to yieldably support the weight. When a heavier load is being carried however, the lever 28 pulls downwardly on the link 31 until the spring leaf 32 is drawn down tight against the upper side of the spring 20 whereupon the effective movement of the lever 28 is limited, so that the spring 20 then comes into play to take the load. In this form of my invention, like that previously described, either or both of the spring devices 32 and 35 may be used.

In addition to acting in the manner above set forth, it will be observed that both forms of my invention will effectively absorb recoil, since such recoil tends to rock the lever oppositely from the movement above specified, and consequently the supplemental spring leaf 15 or 32 as the case may be, is forced away from the main spring of the vehicle. In moving in this manner, the supplemental leaf is of course placed under tension, which tension serves to effectively absorb the recoil.

In the foregoing, I have described two practical forms of my invention in connection with two well known designs of vehicle springs, but I wish it understood that the present disclosure is for illustrative purposes only and that within the scope of the invention as claimed, numerous changes in shape, proportion, and minor details may be made and furthermore the device may be adapted to numerous other forms of vehicle springs.

I claim:

1. The combination with a vehicle having a leaf spring and a part to which the master leaf of said spring is usually connected; of a substantially C-shaped lever provided between its ends with a laterally extending fulcrum ear, means pivotally connecting one end of said lever and said ear with said master leaf and said part, and spring means connected to the other end of said lever for yieldably resisting rocking movement thereof.

2. The combination with a vehicle having a leaf spring and a part to which the master leaf of said spring is usually connected; of a substantially C-shaped lever provided between its ends with a laterally extending fulcrum ear, means pivotally connecting one end of said lever and said ear with said master leaf and said part, a supplemental leaf secured against one curved side of the vehicle spring and diverging with respect thereto toward said lever, and means connecting said supplemental spring leaf with said lever for flexing said leaf toward the vehicle spring as said lever rocks.

3. A spring shackle comprising a C-shaped lever having an apertured fulcrum ear between its ends, a link pivoted to one end of said lever, another link pivoted to the other end of said lever, and a supplemental spring leaf to which said other link is pivoted, said supplemental leaf being adapted to be clamped against one curved side of a vehicle spring; said fulcrum ear and said first named link being adapted to be pivoted to the master leaf of the spring and the parts to which this leaf is usually connected.

In testimony whereof I have hereunto set my hand.

BENJAMIN C. SEATON.